(12) United States Patent
Dryden

(10) Patent No.: US 8,281,645 B2
(45) Date of Patent: Oct. 9, 2012

(54) LEAK DETECTION APPARATUS

(76) Inventor: Kirk Dryden, Aurora, CO (US)

( * ) Notice: Subject to any disclaimer, the term of this patent is extended or adjusted under 35 U.S.C. 154(b) by 392 days.

(21) Appl. No.: 12/564,049

(22) Filed: Sep. 22, 2009

(65) Prior Publication Data
US 2011/0067486 A1 Mar. 24, 2011

(51) Int. Cl.
G01M 3/04 (2006.01)
(52) U.S. Cl. ............... 73/40; 73/40.5 R; 73/49.1
(58) Field of Classification Search ......... 73/40, 40.5 R, 73/49.1; 340/605
See application file for complete search history.

(56) References Cited

U.S. PATENT DOCUMENTS

| 3,864,676 | A | * | 2/1975 | Macias et al. | 600/382 |
| 3,981,181 | A | * | 9/1976 | Ochiai | 73/40.5 R |
| 4,374,379 | A | * | 2/1983 | Dennison, Jr. | 340/604 |
| 4,594,638 | A | * | 6/1986 | Suzuki et al. | 361/280 |
| 4,918,977 | A | * | 4/1990 | Takahashi et al. | 73/40.5 R |
| 5,172,730 | A | * | 12/1992 | Driver | 138/104 |
| 5,381,097 | A | * | 1/1995 | Takatori et al. | 324/512 |
| 5,686,893 | A | | 11/1997 | Jeon | |
| 6,144,209 | A | * | 11/2000 | Raymond et al. | 324/512 |
| 6,310,555 | B1 | | 10/2001 | Stern | |
| 6,877,359 | B2 | * | 4/2005 | Huang et al. | 73/40 |
| 7,218,237 | B2 | | 5/2007 | Kates | |
| 7,398,676 | B2 | | 7/2008 | Lim et al. | |
| 2006/0244616 | A1 | | 11/2006 | Hill | |

* cited by examiner

Primary Examiner — Daniel Larkin
(74) Attorney, Agent, or Firm — Roger A. Jackson

(57) ABSTRACT

An apparatus and method for liquid leak detection includes first and second flexible members each constructed of an electrically conductive material that is in a normally open circuit state. Also included is a liquid wicking permeable surrounding sidewall that is positioned adjacent to the first and second flexible members, the liquid permeable surrounding sidewall is constructed of a non electrically conductive material. Operationally, the liquid wicking permeable surrounding sidewall becomes electrically conductive when a liquid is present in the liquid wicking permeable surrounding sidewall, facilitating the first and second flexible members to move to a closed circuit state that results in a perceptible output. Additionally, included is a liquid permeable planar web reinforcing element that is oriented adjacent to the liquid wicking permeable surrounding sidewall wherein the liquid permeable planar web reinforcing element is oppositely disposed of the first and second flexible members.

13 Claims, 11 Drawing Sheets

Fig. 10

DATA TABLE FOR WATER LEAK DETECTOR SENSOR

| PROTOTYPE NUMBER | TEMP °F | RH % | WATER FLOW CCM | CONFIG. | SECONDS TO LEAK DETECTION | COMMENTS |
|---|---|---|---|---|---|---|
| 1.1 | 75.4 | 21 | 30 | HORIZ | 32.2 | WATER DRIPPING OFF SENSOR |
| 1.2 | 75.4 | 21 | 25 | HORIZ | 21.62 | WATER DRIPPING OFF SENSOR |
| 1.3 | 75.4 | 21 | 25 | HORIZ | 34.47 | WATER DRIPPING OFF SENSOR |
| 1.4 | 75.4 | 21 | 25 | VERT | 10 | NO WATER DRIPPING OFF |
| 1.6 | 81.5 | 20.4 | 25 | HORIZ | 35.1 | NO ABSORBENCY |
| 1.7 | 81.5 | 20.4 | 25 | HORIZ | 32.1 | NO ABSORBENCY |
| 1.8 | 81.5 | 20.4 | 25 | HORIZ | 39.6 | CLAMSHELL CONFIGURATION |
| 1.9 | 81.5 | 20.4 | 25 | VERT | 5.3 | NO WATER DRIPPING OFF |
| 2.1 | 75.2 | 21 | 25 | HORIZ | 7.63 | HORN CONFIGURATION |
| 2.5 | 75.2 | 21 | 25 | HORIZ | 21.7 | HORN CONFIGURATION |
| 2.6 | 75.2 | 21 | 25 | HORIZ | 12.7 | HORN CONFIGURATION |
| 2.7 | 75.2 | 21 | 25 | HORIZ | 10.3 | HORN CONFIGURATION |
| 2.8 | 75.2 | 21 | 25 | HORIZ | 14.62 | HORN CONFIGURATION |
| 2.9 | 75.2 | 21 | 25 | VERT | 7 | HORN CONFIGURATION |

Fig. 11

DATA TABLE FOR WATER LEAK DETECTOR SENSOR

| PROTOTYPE NUMBER | TEMP °F | RH % | WATER FLOW CCM | CONFIG. | SECONDS TO LEAK DETECTION | COMMENTS |
|---|---|---|---|---|---|---|
| 2.11 | 75.2 | 21 | 25 | HORIZ | 11.41 | HORN CONFIGURATION |
| 2.12 | 75.2 | 21 | 25 | VERT | 10.56 | HORN CONFIGURATION |
| 3.1 | 74.1 | 21 | 25 | HORIZ | 53 | NATURAL COTTON FIBER – NO ABSORBENCY |
| 3.2 | 74.1 | 21 | 25 | HORIZ | 7.01 | BAMBOO FIBER +GREAT ABSORBENCY |
| 3.3 | 74.1 | 21 | 25 | HORIZ | 13.35 | BAMBOO FIBER +GREAT ABSORBENCY |
| 3.4 | 74.1 | 21 | 25 | VERT | 3.23 | BAMBOO FIBER +GREAT ABSORBENCY |
| 4.3 | 73.2 | 22 | 25 | HORIZ | 5 | GEN IV – BAMBOO FIBER, 4.5" DIAMETER, CENTER NOTCH, STANDARDIZED WIRE FORM |
| 4.2 | 73.2 | 22 | 25 | VERT | 3.72 | GEN IV – BAMBOO FIBER, 4.5" DIAMETER, CENTER NOTCH, STANDARDIZED WIRE FORM |
| 4.5 | 73.2 | 22 | 25 | HORIZ | 9.72 | GEN IV – BAMBOO FIBER, 4.5" DIAMETER, CENTER NOTCH, STANDARDIZED WIRE FORM |

LEAK DETECTION APPARATUS

TECHNICAL FIELD

The present invention relates generally to fluid leak detection apparatus. More specifically, the present invention relates to an electrically based liquid leak detection apparatus for signaling the presence of a selected amount of moisture in a particular location or area for the typical purpose of indicating a machines operational state, thus initiating a sequence of action that is intended to prevent further damage to the machine or its surrounding support structure/enclosure.

BACKGROUND OF INVENTION

Typically the ideal location for first detecting a leak adjacent to a machine is in an difficult to access location or area, thus placement of an automated leak detection apparatus in its ideal location will hasten the timeliness of a useful perceptible output from the leak detection apparatus to minimize damage to either or both the machine or surrounding structure. Wherein normally without the presence of any type of leak detection apparatus, a small liquid leakage from a machine, say for instance hidden underneath a large heavy ice making machine (that is rarely moved) that has a low volumetric flowrate leak or in other words a seeping leak can cause significant damage to the machine and/or surrounding adjacent structure prior to being detected. Unfortunately, the ice machine will continue to work perfectly during its small leakage phase thus not alerting a user to the presence of the slight leakage condition.

Also, this situation can continue for quite some time until extensive damage has occurred in the hidden machine portions and/or support structure, wherein at some later in time point the structural damage eventually becomes obvious, wherein the structural damage from the liquid seepage is more excessive than it should be. Thus, the result is that the support structure suffers damage that is hidden from view in addition to the leaked fluid, typically water or even worse a fluid that is toxic or chemical in nature that could risk further safety, electrical risk, or environmental harm. Further for the benefit of the machine, a plurality of leak detection apparatus could be utilized to better pin point the source location of the fluid leak thus providing for a quicker diagnosis of the exact leak source to more efficiently fix the leaking machine.

Thus, the key issues for the leak detection apparatus involve, small space or size requirements for the apparatus, as the specific placement location for the apparatus may be in a confined area with difficult accessibility, a further issue in the leak detection apparatus is the sensitivity of generating a perceptible output from a very low liquid leakage flowrate, usually in the range of about 1 milliliter per minute in volume or approximately 1 drop every 10 seconds, which can be a challenge to monitor effectively. Another issue for the leak detection apparatus is in the perceptible output, such that an alarm or signal can be generated to result in an automated sequence of events such as deactivating the machine or shutting off the liquid supply to the machine, in conjunction with remote signals to a data acquisition system for logging events.

The prior art has recognized the importance of low volumetric flowrate fluid leak detection in remote or difficult to access areas, so there are a number of approaches to this problem of low fluid flow rates for liquid leak detection. Starting with United States Patent Publication Number 2006/0244616 to Hill, disclosed is a water leakage monitoring and response system adapted for residential and commercial use. The Hill system is designed to detect water leaks within a building that accumulate on a floor or adjacent to a baseboard perimeter near floor level. The Hill system comprises a flexible, elongated, moisture sensing strip for placement on a floor or adjacent a baseboard or plumbing fixture, comprising flexible upper and lower wires separated by a water permeable, nonconductive layer, and nonconductive upper and lower layers that extend away from the wires to form margins for attaching the strip to a surface and for wicking moisture toward the wires.

The Hill unit also provides an audible warning of low-battery power and can signal a home security system when a leak is detected, see page 1, paragraph 12, and the abstract. Hill has for the actual leak detection, a pair of conductors utilized that are separated by the water permeable material, wherein the water permeable material becomes conductive when it is saturated with liquid, the water permeable material can have extended margins that can act as wicks for bringing liquid to the area of the water permeable material between the wires. Hill teaches another embodiment that includes a grid of conductive material, such as aluminum screen material sandwiched between two pads for coverage of a more square area for leak detection, such as a floor as opposed to a more longitudinal, i.e. pipe based leak detection system. Further taught by Hill is a non permeable base sheet material that can retain the leaked liquid, similar to a diaper, for a limited time period or a limited amount of liquid volume, while the leak signal is communicated while simultaneously protecting the underlying surface from liquid seepage.

Hill has no teaching specific to details of the wicking process or unique configurations of the permeable material to enhance liquid leak detection for specific leak monitoring situations, such as curved tubing, and the like, as Hill is primarily for horizontal linear floor and baseboard structures for overall liquid leak detection. Further, Hill would require a larger adjacent planar area below the machine that needs leak detection for the leak detection system to work properly, thus Hill would have difficulty if the machine were mounted in an area that didn't provide an adjacent planar surface, such as mounting the machine within a cabinet grouping.

Further continuing in the prior art in U.S. Pat. No. 6,310,555 to Stern, disclosed is a battery-powered liquid and humidity detection and alarm system comprising a transistorized moisture sensor, alarm system, and low-battery alert. The sensor aspect of the Stern device is in the form of an outer and inner ring of copper coils, and is positioned in place by a rubber or similarly flexible strip. The presence of moisture on the sensor element causes a forward bias in the transistor, triggering an audible alarm or flashing light. The sensor in Stern is sensitive as to detect unwarranted moisture as the presence of human sweat or several molecules of water droplets in contact with the sensor element. The alarm in Stern is also capable of being wired to a remote radio-operated control unit, and a land based phone line to notify a plumber, see Column 2, lines 49-61. Stern also uses changes in circuit leakage currents which correspond to a voltage change for generating a signal resulting from the presence of moisture adjacent to the conductors.

Continuing in the leakage detection arts, in U.S. Pat. No. 7,398,676 to Lim et al. disclosed is a leak sensor and leak sensing system which may include a liquid sensing member capable of sensing and indicating the presence of a liquid leakage. In Lim et al., two or more wires may further be combined within the liquid sensing member and the leak sensor may include a film that is capable of visually indicating the presence of a specific liquid type that is leaked from a pipe through which the liquid flows, i.e. in the form of litmus paper. The film in Lim et al., preferably encircles a circumference of the pipe and at least two wires may be incorporated in the film, with the wires being are preferably configured to be short-circuited by contact with the liquid leaked from the pipe. The leak sensing system in Lim et al., may include a plurality of liquid sensors with the liquid sensors being preferably arranged to encircle a pipe through which a liquid flows at multiple locations along the pipe where leaks are likely to occur, see Column 2, lines 5-28.

Further, in the leakage detection art field, in U.S. Pat. No. 5,686,893 to Jeon, disclosed is a water leakage detecting apparatus for a water purifier by which the purifying operation can be stopped to thereby generate an alarm for enabling an immediate remedial action, and at the same time, to make the water purifier hygienically and accident-free, where water leakage occurs due to poor sealing of connecting pipes through which the water passes and clogging of an overflow pipe for preventing proper drainage of overflowing water. In Jeon, this objective can be accomplished by a water leakage detecting apparatus of a water purifier employing a storage tank in order to store water purified in a pre-processing filter, membrane, and a post-processing filter.

The apparatus in Jeon comprises, a water leakage detecting means for detecting water leakage outside of the storage tank in water utilizing a water leakage tray pan, control means for receiving a leakage detecting signal detected by the water leakage detecting means to thereby control overall water purifying operations. A display means in also included in Jeon for receiving a control signal output from the control means according to the leakage detecting signal detected by the leakage detecting means to thereby indicate whether or not there has occurred a leakage and an alarm generating means for receiving the control signal generated from the control means according to the leakage detecting signal detected by the leakage detecting means to thereby generate an alarm for informing an occurrence of water leakage, see Column 2, lines 36-63. As to the water sensor 63 in Jeon, there is no detailed teaching as to the function of the sensor 63 other than its power supply circuitry that includes R1, R2, and C1, as shown in FIG. 6.

Next in looking at the prior art for liquid leakage detection, in U.S. Pat. No. 7,218,237 to Kates, disclosed is a method and apparatus for detecting water leaks being a tray pan type arrangement as in Jeon disclosed above, wherein the liquid rising level is detected to indicate leakage. The system in Kates includes one or more intelligent sensor units and a base unit that can communicate with the sensor units. When one or more of the sensor units in Kates detects an anomalous condition (e.g., smoke, fire, water, etc.) the sensor unit communicates with the base unit and provides data regarding the anomalous condition. The base unit in Kates can contact a supervisor or other responsible person by a plurality of techniques, such as, telephone, pager, cellular telephone, internet (and/or local area network), etc.

In one embodiment in Kates, one or more wireless repeaters are used between the sensor units and the base unit to extend the range or the system and to allow the base unit to communicate with a larger number of sensors, see Column 1, lines 41-56. In Kates, there is no specific teaching as to the detailed workings of the moisture or water level sensor, being more of a system combination of gas and temperature level sensing and indication. Further in Kates, the tray pan arrangement would not likely be acceptable for built-in type machines that would desirably require leak detection, or for machines that are attached to cabinetry or that have custom matching front panels, wherein the clearances as between the machine and the adjoining structure are minimal, being as small as 1/16 of an inch. In addition, if the machine needing leak detection were elevated above the floor surface, i.e. mounting within cabinetry, a tray would not be easily possible, much the same as the problem in Hill previously described.

What is needed is a leak detection apparatus that is adaptable to being functional in sensing presence of a liquid in an area based upon very low liquid flow rates with the leak detection apparatus including a first flexible member that is constructed of an electrically conductive material that is in an normally open circuit state and a second flexible member also constructed of an electrically conductive material that is in an normally open circuit state. Also included in the leak detection apparatus would be a liquid wicking permeable surrounding sidewall that is adjacent to the first and second flexible members, with the liquid permeable surrounding sidewall being constructed of a non electrically conductive material, wherein operationally the liquid wicking permeable surrounding sidewall becomes electrically conductive when the liquid is present in the liquid wicking permeable surrounding sidewall, facilitating the first and second flexible members to move from the normally open circuit state to a closed circuit state thus facilitating that the perceptible output be made for the liquid leakage occurring to alert a maintenance operation for remedying the leakage. Further, a liquid permeable planar web reinforcing element that is oriented adjacent to the liquid wicking permeable surrounding sidewall and an additional liquid channeling structure and absorption material to better facilitate low flow rate liquid leakage directed to the first and second flexible members to facilitate the perceptible output of the liquid leakage.

SUMMARY OF INVENTION

Broadly, the present invention is for a leak detection apparatus for sensing presence of a liquid in an area, with the leak detection apparatus including a first flexible member having a first longitudinal axis, wherein the first flexible member is constructed of an electrically conductive material that is in a normally open circuit state. Further included in the leak detection apparatus is a second flexible member having a second longitudinal axis, wherein the second flexible member is constructed of an electrically conductive material that is in a normally open circuit state. Also included in the leak detection apparatus is a liquid wicking permeable surrounding sidewall that is about a radial axis, the liquid wicking permeable surrounding sidewall is positioned adjacent to the first and second flexible members, the liquid permeable surrounding sidewall is constructed of a non electrically conductive material. Wherein operationally, the liquid wicking permeable surrounding sidewall becomes electrically conductive when the liquid is present in the liquid wicking permeable surrounding sidewall, facilitating the first and second flexible members to move from the normally open circuit state to a closed circuit state that results in a perceptible output. Additionally, included is a liquid permeable planar web reinforcing element that is oriented adjacent to the liquid wicking permeable surrounding sidewall wherein the liquid permeable planar web reinforcing element is oppositely disposed of the first and second flexible members.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 10 is the first half of the test data table for various times to leak detection from different materials for the wicking permeable surrounding sidewall, different liquid communication line attachment configurations for the leak detection apparatus, and with and without the center notch or liquid channel disposed within the liquid permeable planar web reinforcing element; and FIG. 11 is the second half of the test data table for various times to leak detection from different materials for the wicking permeable surrounding sidewall, different liquid communication line attachment configurations for the leak detection apparatus, and with and without the center notch or liquid channel disposed within the liquid permeable planar web reinforcing element.

REFERENCE NUMBERS IN DRAWINGS

Figure 1:
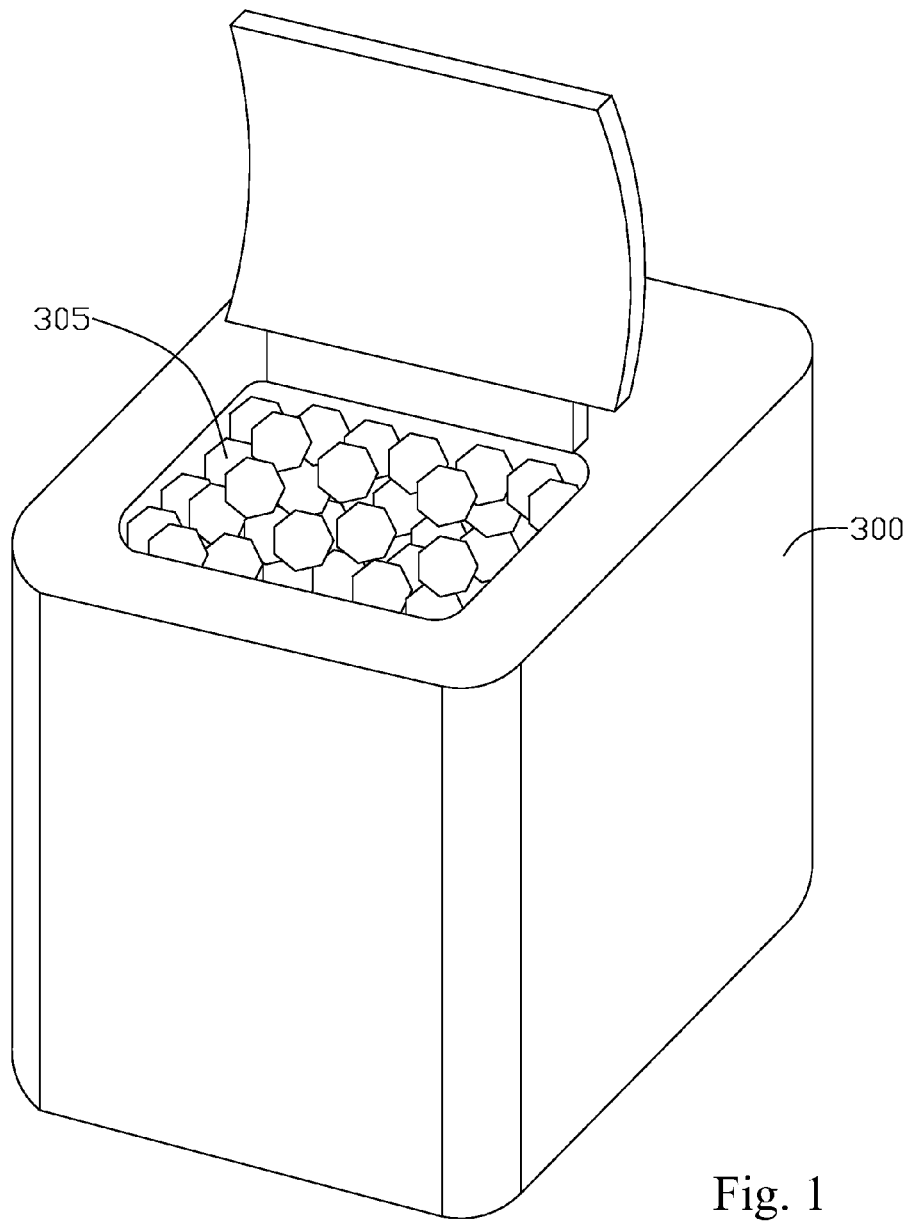
FIG. 1 shows a perspective view of the typical ice machine alone.

30 Leak detection apparatus
35 Sensing presence of the liquid 40 in an area 45
40 Liquid
45 Liquid/leakage in an area
50 Liquid communication line
55 Liquid flow axis
60 Low amount of liquid leakage
65 High amount of liquid leakage
70 Longwise axis of the liquid communication line
75 First flexible member
80 First longitudinal axis of first flexible member 75
85 Second flexible member
90 Second longitudinal axis of second flexible member 85
95 Normally open circuit state of the first 75 and second 85 flexible members
100 Closed circuit state of the first 75 and second 85 flexible members
105 High resistance distance closed circuit state of the first 75 and second 85 flexible members
110 Low resistance distance closed circuit state of the first 75 and second 85 flexible members
115 Atomized adhesive disposed upon the first 75 and second 85 flexible members
120 Temperature sensitive adhesive disposed upon the margins 195
125 Liquid wicking permeable surrounding sidewall
130 Sodium polyacrylate base material in granular form
135 Liquid wicking permeable surrounding sidewall 125 is infused with the sodium polyacrylate base material 130
140 Radial axis for the liquid wicking permeable surrounding sidewall 125
145 Liquid wicking permeable surrounding sidewall 125 positioned adjacent to the first 75 and second 85 flexible members
150 Liquid wicking permeable surrounding sidewall 125 is positioned to encase a portion of the first 75 and second 85 flexible members by virtue of the atomized adhesive 115 disposed upon the first 75 and second 85 flexible members
155 Liquid wicking permeable surrounding sidewall 125 becomes electrically conductive when the liquid 40 is present in the liquid wicking permeable surrounding sidewall 125
160 Liquid wicking permeable surrounding sidewall 125 encases the first 75 and second 85 flexible members within the sidewall 125
165 Liquid communication substantially through the liquid wicking permeable surrounding sidewall 125 from the leakage area 45 to the first 75 and second 85 flexible members
170 Liquid permeable planar web reinforcing element(s)
175 Liquid permeable planar web reinforcing element oriented adjacent to the liquid wicking permeable surrounding sidewall 125
180 Liquid permeable planar web reinforcing element is oppositely disposed of the first 75 and second 85 flexible members
185 Liquid permeable planar web reinforcing element encases the liquid wicking permeable surrounding sidewall 125
190 Sandwich of the liquid wicking permeable surrounding sidewall 125 by virtue of the atomized adhesive 115 disposed upon the liquid wicking permeable surrounding sidewall 125 by the pair of liquid permeable planar web reinforcing elements 170

195 Margin portions of the pair of liquid permeable planar web reinforcing elements 170 that each have a margin portion 195 that extends beyond the liquid wicking permeable surrounding sidewall 125
200 Margin portions are affixed to one another by virtue of the temperature sensitive adhesive 120
205 Frustroconical shape formed of the liquid wicking permeable surrounding sidewall 125 and the liquid permeable planar web reinforcing element 170
206 Major diameter of frustroconical shape 205
207 Minor diameter of frustroconical shape 205
210 Lengthwise axis of the frustroconical shape 205
215 Helping to direct the liquid 40 toward the first 75 and second 85 flexible members from the frustroconical shape 205
220 Means for removable engagement
225 Double sided tape for the means for removable engagement 220
230 Liquid channel
235 Liquid channel is oriented lengthwise to be substantially parallel to the lengthwise axis 210
240 Liquid channel further helps to direct the liquid 40 toward the first 75 and second 85 flexible members
245 Distance as between each of the first 75 and second 85 flexible members along their respective first 80 and second 90 longitudinal axes and the liquid channel 230
250 Radial axis 140 and the liquid flow axis 55 being substantially co-axial
255 Liquid permeable planar web reinforcing element 170 that faces the liquid communication line 50
260 Forming the combined first 75 and second 85 flexible members, the surrounding sidewall 125, and the planar web reinforcing elements 170 into the frustroconical shape 205 adjacent to the liquid communication line 50
265 Positioning the frustroconical shape 205 such that the radial axis 140 and the liquid flow axis 55 are substantially co-axial
270 Attaching the pair of liquid permeable planar web reinforcing elements 170 by virtue of the means 220 for removable engagement
275 Positioning the liquid channel 230 to be oriented lengthwise to be substantially parallel to the liquid flow axis 55
276 Positioning the liquid channel 230 to be oriented below the liquid communication line 50
280 Positioning a major diameter 206 of the frustroconical shape 205 to be elevated above a minor diameter 207 of the frustroconical shape 205
285 Circumferential distance of the combination of the sidewall 125 and the planar web reinforcing element 170
300 Ice machine
305 Ice

DETAILED DESCRIPTION

Figure 2:
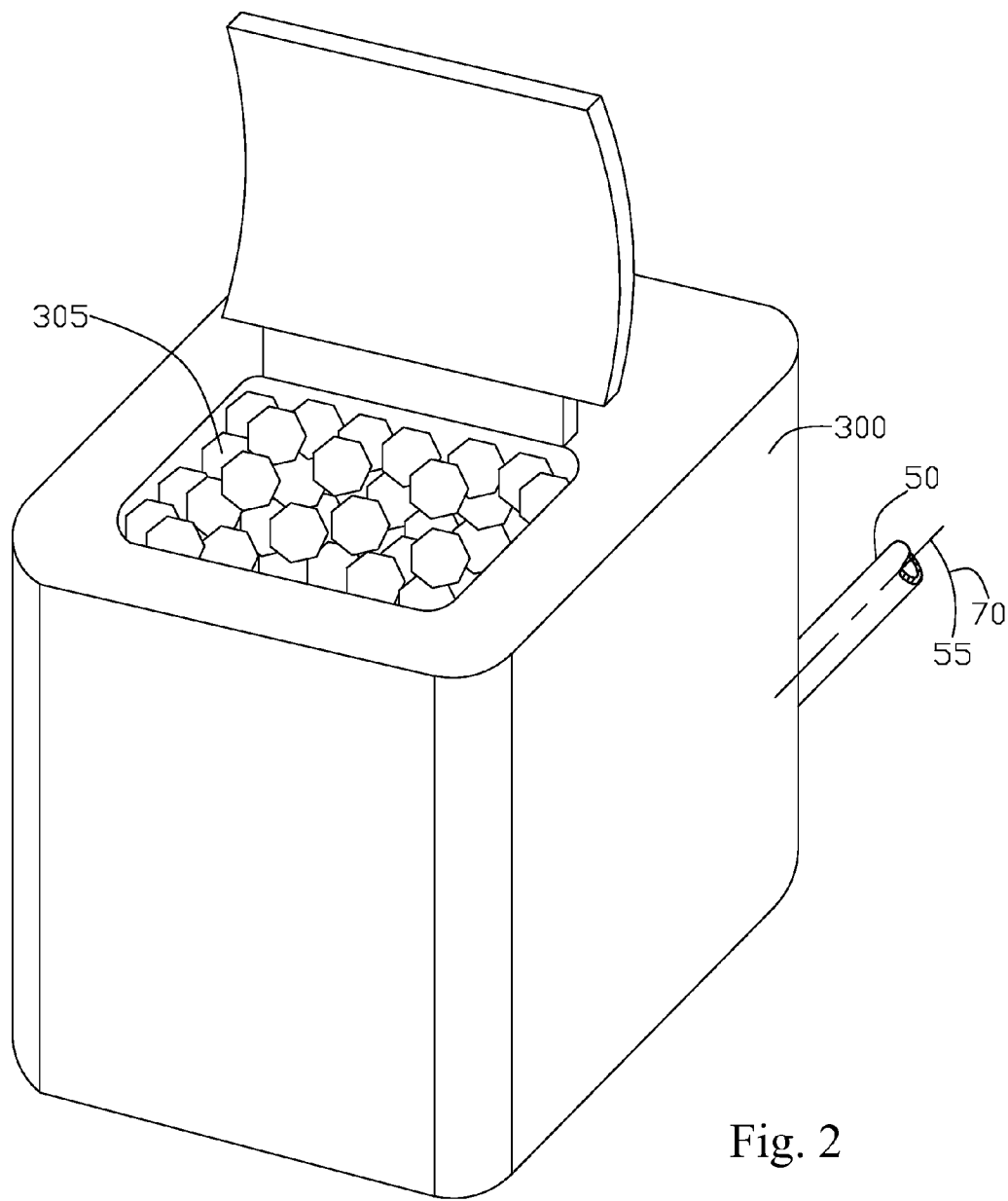
FIG. 2 shows a perspective view of the typical ice machine in addition to showing the liquid communication line.
Figure 3:
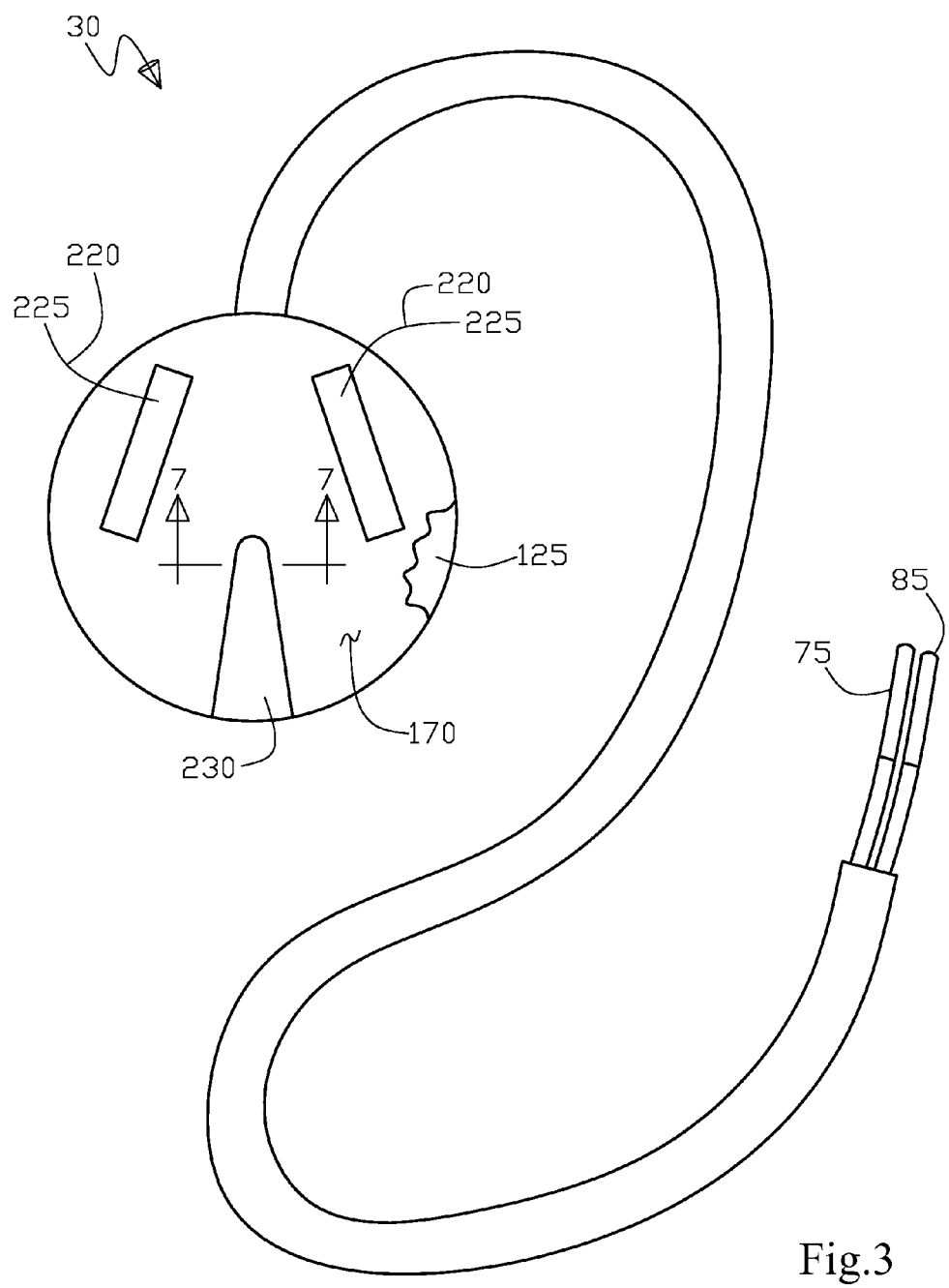
FIG. 3 shows a flat plan view of the leak detection apparatus including the first and second flexible members, the liquid wicking permeable surrounding sidewall, the liquid permeable planar web reinforcing element, the liquid channel, and the means for removable engagement.
Figure 4:
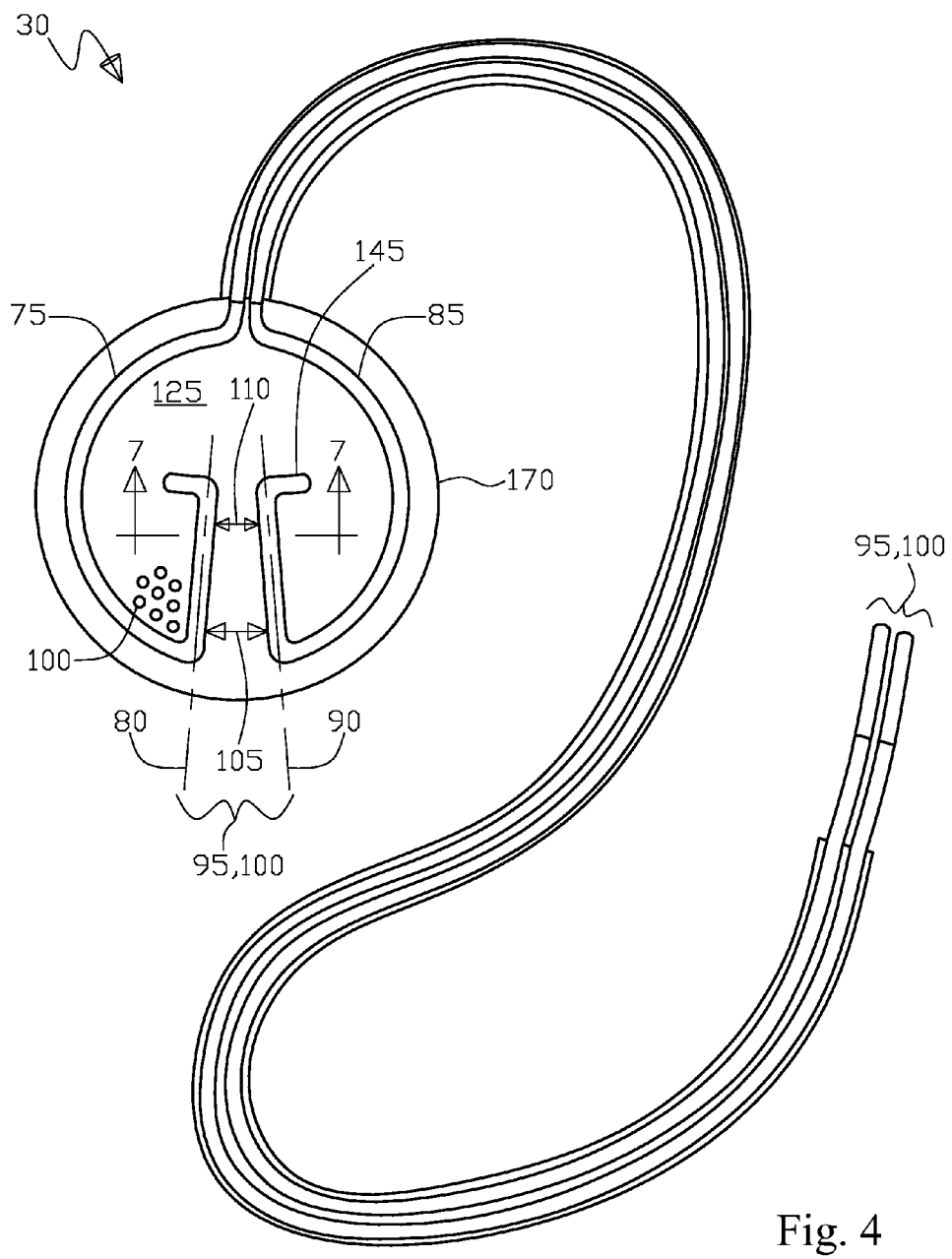
FIG. 4 shows a flat plan view of the leak detection apparatus including the first and second flexible members being fully exposed, the liquid wicking permeable surrounding sidewall, and the liquid permeable planar web reinforcing element.

With initial reference to FIG. 1 shown is a perspective view of the typical ice machine 300 alone with the ice 305, and FIG. 2 shows a perspective view of the typical ice machine 300 and ice 305 in addition to showing the liquid communication line 50. Further, FIG. 3 shows a flat plan view of the leak detection apparatus 30 including the first 75 and second 85 flexible members, the liquid wicking permeable surrounding sidewall 125, the liquid permeable planar web reinforcing element 170, the liquid channel 230, and the means 220 for removable engagement. Continuing, FIG. 4 shows a flat plan view of the leak detection apparatus 30 including the first 75 and second 85 flexible members being fully exposed, the liquid wicking permeable surrounding sidewall 125, and the liquid permeable planar web reinforcing element 170.

Figure 5:
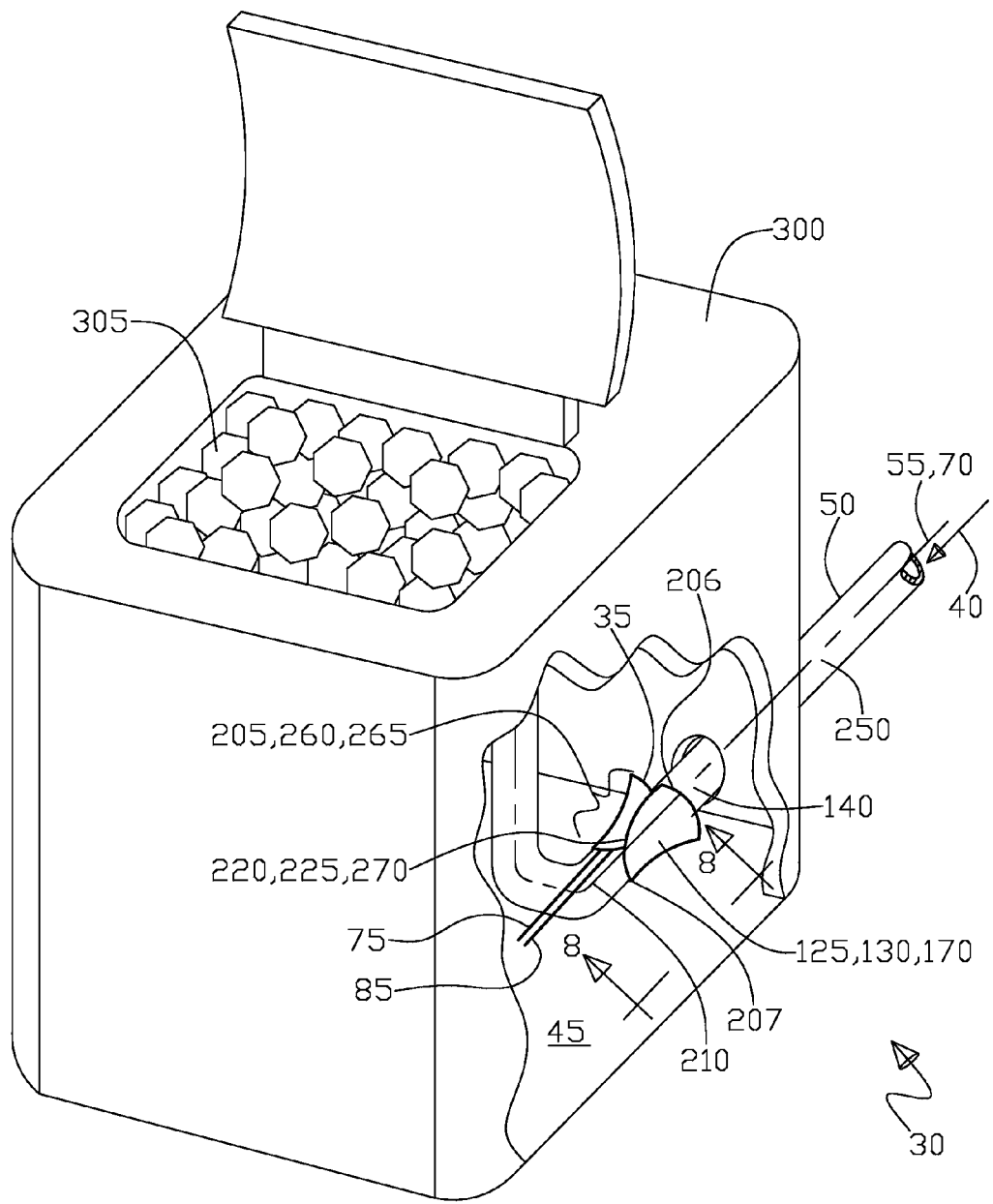
FIG. 5 shows a perspective view of the ice machine including the liquid communication line with the leak detection apparatus formed into a frustroconical shape about and around the liquid communication line, wherein the leak detection apparatus is disposed within the ice machine.
Figure 6:
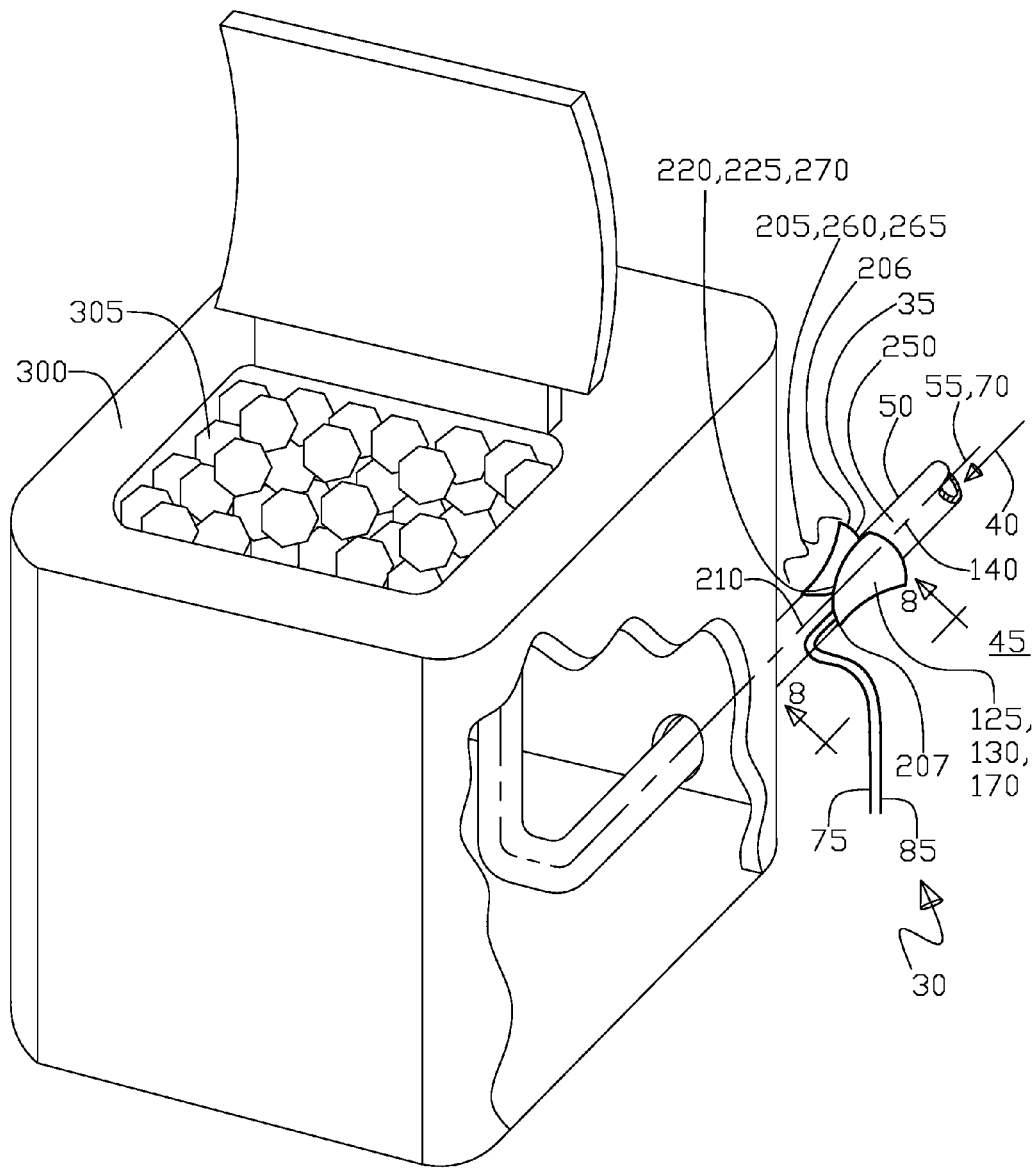
FIG. 6 shows a perspective view of the ice machine including the liquid communication line with the leak detection apparatus formed into a frustroconical shape about and around the liquid communication line, wherein the leak detection apparatus is disposed outside of the ice machine.
Figure 7:
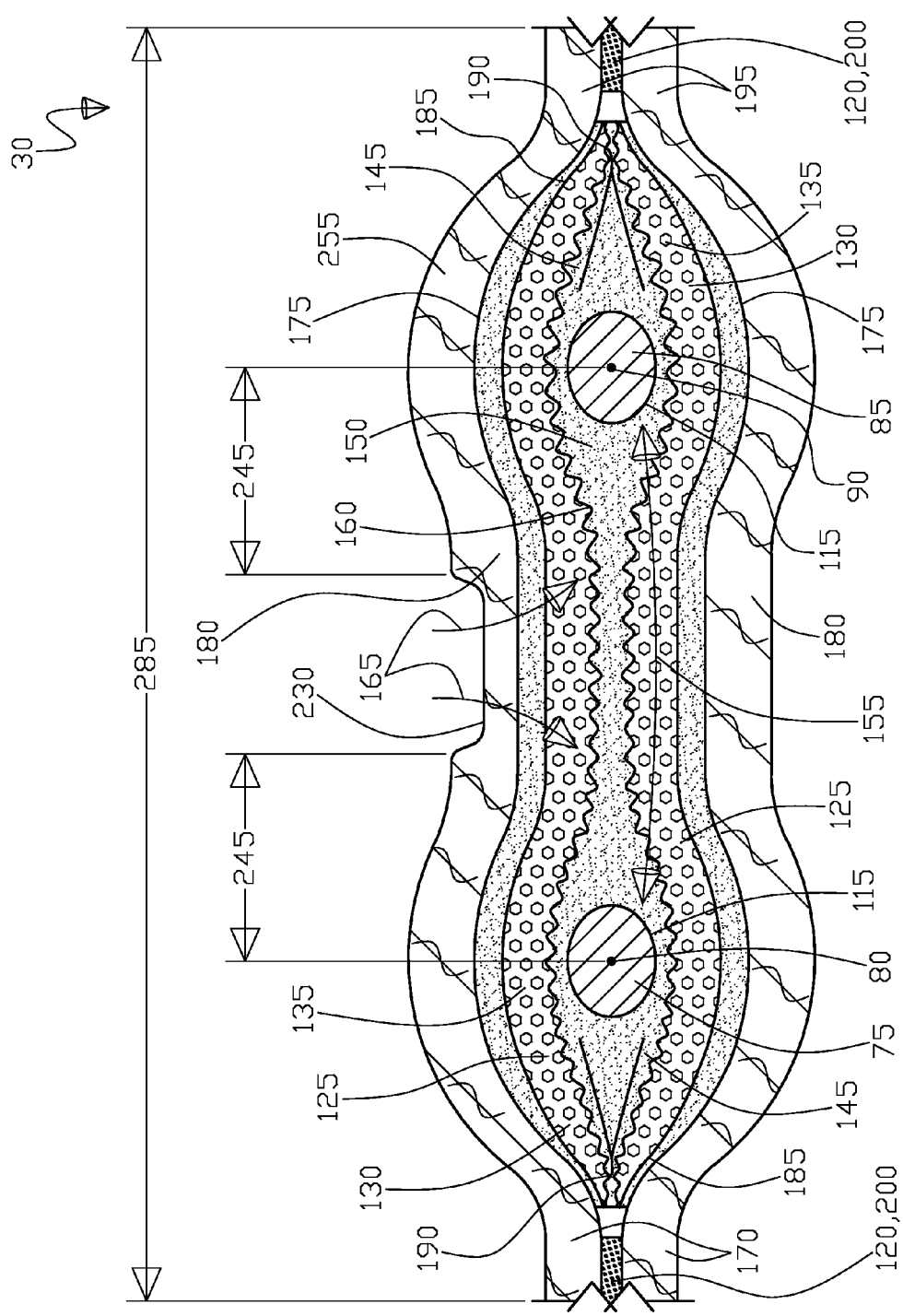
FIG. 7 shows cross section 7-7 from both FIGS. 3 and 4 for clarity of the first and second flexible members that are disposed within the atomized adhesive, the liquid wicking permeable surrounding sidewall, the atomized adhesive, the liquid permeable planar web reinforcing element, the liquid channel, the margins, and the temperature sensitive adhesive.

Next, in FIG. 5 shows a perspective view of the ice machine 300 including the liquid communication line 50 with the leak detection apparatus 30 formed into a frustroconical shape 205 about and around the liquid communication line 50, wherein the leak detection apparatus 30 is disposed within the ice machine 300. Further, FIG. 6 shows a perspective view of the ice machine 300 including the liquid communication line 50 with the leak detection apparatus 30 formed into a frustroconical shape 205 about and around the liquid communication line 50, wherein the leak detection apparatus 30 is disposed outside of the ice machine 300. Next, FIG. 7 shows cross section 7-7 from both FIGS. 3 and 4 for clarity of the first 75 and second 85 flexible members that are disposed within the atomized adhesive 115, the liquid wicking permeable surrounding sidewall 125, the liquid permeable planar web reinforcing element 170, the liquid channel 230, the margins 195, and the temperature sensitive adhesive 120.

Figure 8:
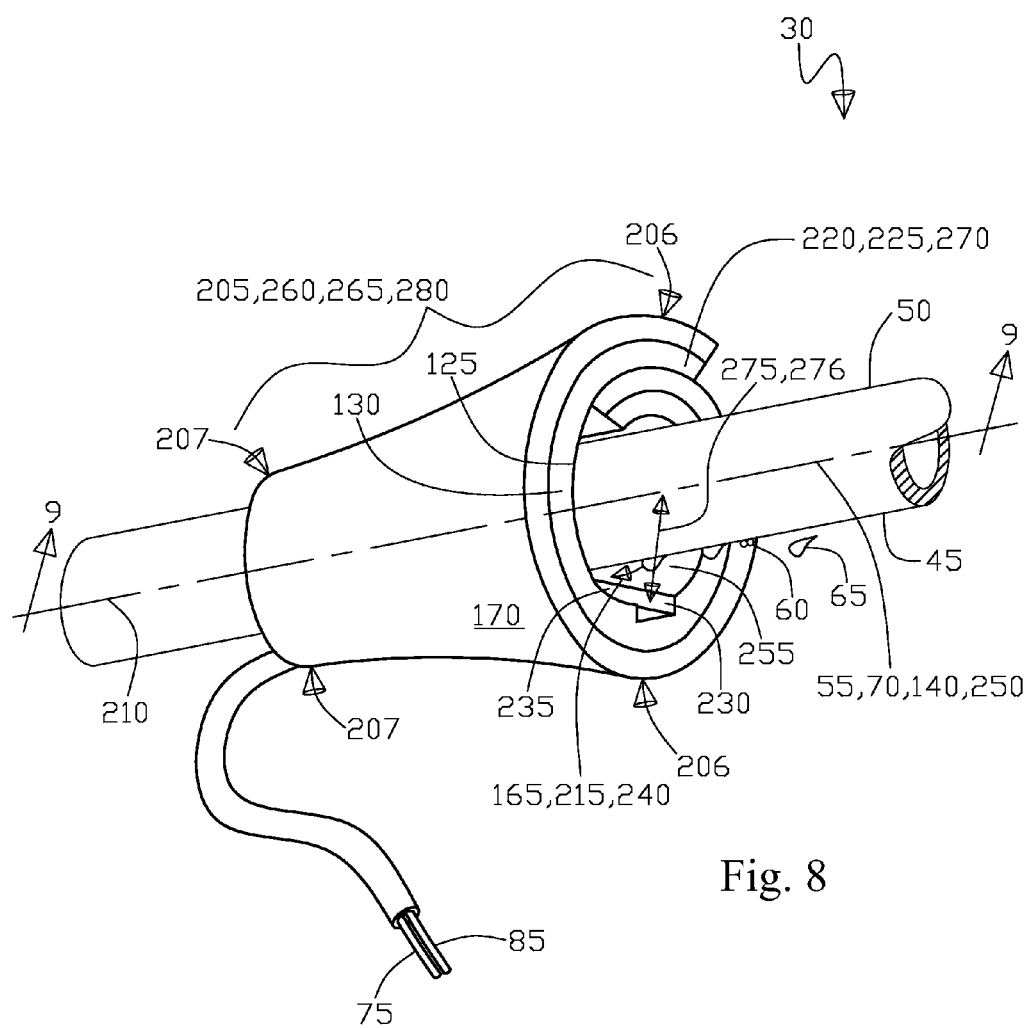
FIG. 8 shows a close up or expanded perspective use view of the exterior of the leak detection apparatus that is formed into the frustroconical shape about the liquid communication line wherein the liquid channel is shown directing the liquid leakage in conjunction with the frustroconical shape specifically along the liquid permeable planar web reinforcing element that faces the liquid communication line.
Figure 9:
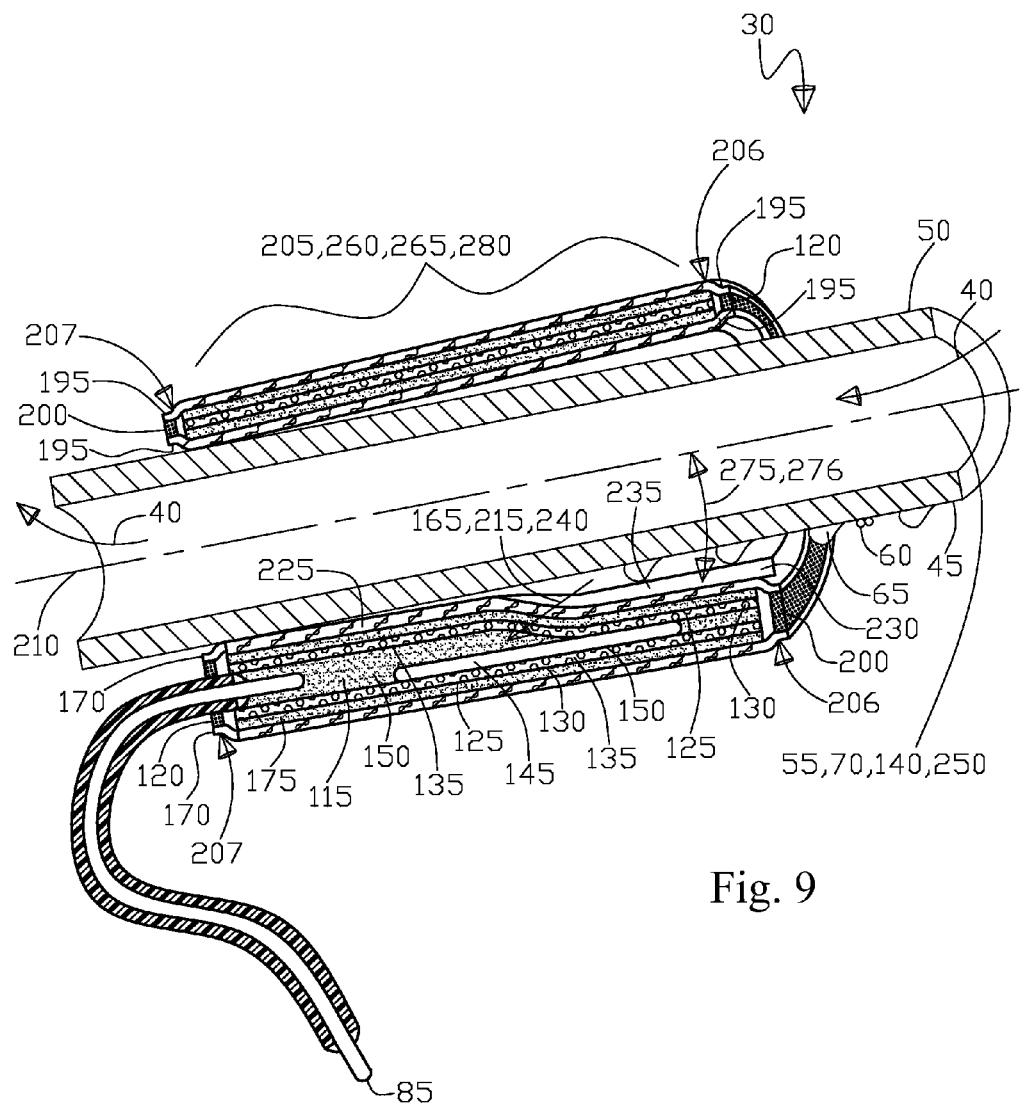
FIG. 9 shows a close up or expanded cross sectional use view section 9-9 from FIG. 8 with the cross sectional view of the leak detection apparatus shown that is formed into the frustroconical shape partially about the sectioned liquid communication line wherein the liquid channel is shown directing the liquid leakage in conjunction with the frustroconical shape specifically along the liquid permeable planar web reinforcing element that faces the liquid communication line, also shown is the second flexible member that is disposed within the atomized adhesive, the liquid wicking permeable surrounding sidewall, the atomized adhesive, the liquid permeable planar web reinforcing elements, the margins, and the temperature sensitive adhesive.

Continuing, FIG. 8 shows a close up or expanded perspective use view of the exterior of the leak detection apparatus 30 that is formed into the frustroconical shape 205 about the liquid communication line 50 wherein the liquid channel 230 is shown directing the liquid leakage 45 in conjunction with the frustroconical shape 205 specifically along the liquid permeable planar web reinforcing element 170 that faces the liquid communication line 50. Further, FIG. 9 shows a close up or expanded cross sectional use view section 9-9 from FIG. 8 with the cross sectional view of the leak detection apparatus 30 shown that is formed into the frustroconical shape 205 partially about the sectioned liquid communication line 50 wherein the liquid channel 230 is shown directing the liquid leakage 45 in conjunction with the frustroconical shape 205 specifically along the liquid permeable planar web reinforcing element 170 that faces the liquid communication line 50. Also shown in FIG. 9 is the second flexible member 85 that is disposed within the atomized adhesive 115, the liquid wicking permeable surrounding sidewall 125, the liquid permeable planar web reinforcing elements 170, the margins 195, and the temperature sensitive adhesive 120.

Further, to FIG. 10 is the first half of the test data table for various times to leak detection from different materials for the wicking permeable surrounding sidewall 125, (not shown) different liquid communication line 50 (not shown) attachment configurations for the leak detection apparatus 30 (not shown), and with and without the center notch or liquid channel 230 (not shown) disposed within the liquid permeable planar web reinforcing element 170 (not shown). Continuing, FIG. 11 is the second half of the test data table for various times to leak detection from different materials for the wicking permeable surrounding sidewall 125 (not shown), different liquid communication line 50 (not shown) attachment configurations for the leak detection apparatus 30 (not shown), and with and without the center notch or liquid channel disposed 230 (not shown) within the liquid permeable planar web reinforcing element 170 (not shown).

Broadly, as best shown in FIGS. 3 to 9, the present invention is for a leak detection apparatus 30 for sensing 35 presence of a liquid 45 in an area, with the leak detection apparatus 30 including a first flexible member 75 having a first longitudinal axis 80, wherein the first flexible member 75 is constructed of an electrically conductive material that is in a normally open circuit state 95. Further included in the leak detection apparatus 30 is a second flexible member 85 having a second longitudinal axis 90, wherein the second flexible member 85 is constructed of an electrically conductive material that is in a normally open circuit state 95. Also included in the leak detection apparatus 30 is a liquid wicking permeable surrounding sidewall 125 that is about a radial axis 140, the liquid wicking permeable surrounding sidewall 125 is positioned adjacent 145 to the first 75 and second 85 flexible members, with the liquid permeable surrounding sidewall 125 being constructed of a non-electrically conductive material. Further, the leak detection apparatus 30 could also be used for sensing presence of a liquid 40 external to the liquid communication line 50 having a liquid flow axis 55, in either a vertical or horizontal orientation, or any angular orientation in-between vertical and horizontal for the liquid flow axis 55. Note that typically the liquid 40 is water, however, the liquid 40 could be other liquids as other uses dictate.

Wherein operationally, as indicative of the performance data shown in FIGS. 10 and 11, the liquid wicking permeable surrounding sidewall 125 becomes electrically conductive 155 when the liquid 40 is present in the liquid wicking permeable surrounding sidewall 125, facilitating the first 75 and second 85 flexible members to move from the normally open circuit state 95 to a closed circuit state 100 that results in a perceptible output. Further, the material of construction for the first 75 and second 85 flexible members is preferably an 18 Gauge single strand copper wire, or a suitable equivalent. Note that the first 75 and second 85 flexible members both have typical wire insulation extending from a portion of the termination portion (the first 75 and second 85 flexible members are adjacent near their termination portions, wherein the wire has no insulation, see FIG. 4) to the wire leads going outside of the liquid wicking permeable surrounding sidewall 125 that have wire insulation. Additionally, included is a liquid permeable planar web reinforcing element 170 that is oriented adjacent 175 to the liquid wicking permeable surrounding sidewall 125, wherein the liquid permeable planar web reinforcing element 170 is oppositely disposed 180 from the first 75 and second 85 flexible members.

As an alternative the leak detection apparatus 30 can further include a sodium polyacrylate base material 130 disposed adjacent to the liquid wicking permeable surrounding sidewall 125, as best shown in FIG. 7, wherein operationally the sodium polyacrylate base material 130 further adds liquid 40 absorption capabilities to the liquid wicking permeable surrounding sidewall 125. The sodium polyacrylate base material 130 is preferably in granular form and is infused 135 into the liquid wicking permeable surrounding sidewall 125. Further, on the sodium polyacrylate base material 130, preferably about one-half gram is used for each leak detection apparatus 30 that has the capability to absorb about seventy-five milliliters of liquid 40, being operational to help direct the liquid 40 toward the first 75 and second 85 flexible members for creating the perceptible output and directing the liquid away from precipitating from out of the liquid wicking permeable surrounding sidewall 125 and typically onto the floor surface, with the increased potential to cause structural damage.

To optionally further refine the leak detection apparatus 30 and in looking specifically at the liquid wicking permeable surrounding sidewall 125 and the liquid permeable planar web reinforcing element 170 a frustroconical shape 205 or termed "horn configuration" that can be formed to partially encase the area defined by a liquid communication line 50, as best shown in FIGS. 5, 6, 8, and 9. Wherein the frustroconical shape 205 has a lengthwise axis 210 and the liquid communication line 50 has a longwise axis 70 positioned such that the lengthwise axis 210 and the longwise axis 70 are substantially co-axial, wherein operationally the frustroconical shape 205 helps to direct the liquid 40 toward the first 75 and second 85 flexible members, as indicated in the leak detection apparatus 30 performance data in FIGS. 10 and 11, notably the horn configuration or frustroconical shape 205 tests which show on average desirable faster or shorter times to the perceptible output or seconds to leak detection.

In looking at the specific numbers in FIGS. 10 and 11, for the horizontal case of the longwise axis 70, the frustroconical shape 205 had about a 60% reduction in perceptible output times as compared to the clamshell configuration or simply a cylindrical wrap of the liquid wicking permeable surrounding sidewall 125 about the liquid communication line 50. Further, in looking at FIGS. 10 and 11, for the vertical case of the longwise axis 70, the frustroconical shape 205 had about a 30% reduction in perceptible output times as compared to the clamshell configuration or simply a cylindrical wrap of the liquid wicking permeable surrounding sidewall 125 about the liquid communication line 50. In any case the frustroconical shape 205 had substantially better performance being defined as shorter times to leak detection or perceptible output, i.e. moving from the open circuit state 95 to the closed circuit state 100 than the straight cylindrical shape about the liquid communication line 50.

Continuing, on the leak detection apparatus 30 the frustroconical shape 205 can further optionally include a liquid channel 230 disposed within the liquid permeable planar web reinforcing element 170, wherein the liquid channel 230 is oriented lengthwise 235 to be substantially parallel to the lengthwise axis 210. Wherein, the liquid channel 230 further helps to direct 215 the liquid 40 toward the first 75 and second 85 flexible members. The liquid channel 230 is best shown in FIGS. 7, 8, and 9, as the channel 230 is preferably positioned somewhat adjacent to the liquid communication line 50, as best shown in FIGS. 8 and 9. The actual liquid channel 230 utilized in testing was preferably about one-half inch wide by about one-sixteenth inch deep, however, different widths and depths of the liquid channel 230 could be utilized. The enhanced leak detection apparatus 30 benefit from the liquid channel 230 is best depicted in the test data FIG. 11, wherein the liquid channel 230 is indicated as the center notch that shows the lower times to leak detection for both horizontal and vertical orientations of the liquid communication line 50. Thus in the horizontal case of the liquid communication line 50 the liquid channel 230 resulted in an improvement of about a 25% reduction in time towards leak detection or perceptible output. For the vertical case of the liquid communication line 50 the addition of the liquid channel 230 actually resulted in about 15% increase in time which is safe to say that this 15% variance was within a measurement error factor, leading to the conclusion that the benefit of the liquid channel 230 is minimal in the vertical orientation case of the liquid communication line 50.

Another option for the leak detection apparatus 30 concerning the liquid wicking permeable surrounding sidewall 125 and the liquid permeable planar web reinforcing element 170 further comprise a means 220 for removable engagement to the liquid communication line 50, as best shown in FIGS. 5, 6, 8, and 9. Preferably the means 220 for removable engagement is a double sided tape 225, specified as 3M Double Sided Tape Model Number 9086, or alternatively a hook and loop fastener type, although other means 220 of removable engagement could be employed such as zippers, snaps, flexible tongue and groove arrangements, other re-useable adhesives, and the like. Operationally the means 220 for removable engagement functions much like a "burrito wrap tortilla" wherein the liquid wicking permeable surrounding sidewall 125 and the liquid permeable planar web reinforcing element 170 being a flexible planar laminate act encase the liquid communication line 50 that may have an overlap at the means 220 for removable engagement as shown in FIGS. 5, 6, and 8.

Looking to the materials of construction for the leak detection apparatus 30 the liquid wicking permeable surrounding sidewall 125 is preferably constructed of material selected from the group consisting essentially of bamboo fiber and cotton. In referring to the test data FIG. 11, it can be seen that the use of bamboo fiber with natural cotton fiber for the liquid wicking permeable surrounding sidewall 125 provides a substantial benefit in beneficially reducing the time to leak detection, in fact in the case shown on the horizontal liquid communication line 50 orientation the time to leak detection went from 53 seconds to 7.01 seconds, an approximately 83% reduction, which leads to the conclusion that the bamboo wicks the liquid 40 at a much greater rate than natural cotton alone. As far as the actual materials of the liquid wicking permeable surrounding sidewall 125 for the bamboo fiber and natural cotton are a 50% blend of Bamboo Fiber and a 50% blend of FAIRFIELD brand Cotton combined in a one-eighth inch thick batting. Continuing, as the liquid wicking permeable surrounding sidewall 125 is preferably constructed of bamboo fiber and cotton preferably configured as a flexible planar section, the structural integrity of the liquid wicking permeable surrounding sidewall 125 is such that if much pulling or tensile stress is placed upon the liquid wicking permeable surrounding sidewall 125, i.e. during installation of wrapping the sidewall 125 about the liquid communication line 50, the sidewall may undesirably rupture.

Thus, as a remedy to this rupturing issue a laminate can be formed by alternatively adding the liquid permeable planar web reinforcing element 170 such that it encases the liquid wicking permeable surrounding sidewall 125, as best shown in the cross sectional FIG. 7. The liquid permeable planar web reinforcing element 170 allows the liquid 40 through by being liquid 40 permeable with the liquid 40 communicating through to the liquid wicking permeable surrounding sidewall 125. The preferred material of construction for the liquid permeable planar web reinforcing element 170 is a fusible web, also known as PELLON brand Fusible Interfacing, or a suitable equivalent. In addition, the liquid permeable planar web reinforcing element 170 can be on one side of the liquid wicking permeable surrounding sidewall 125 or on both sides of the liquid wicking permeable surrounding sidewall 125, whereas FIG. 7 shows the liquid permeable planar web reinforcing element 170 encasing 185 on both sides of the liquid wicking permeable surrounding sidewall 125, essentially sandwiching 190 the sidewall 125 by the liquid permeable planar web reinforcing element 170. Further, as the liquid wicking permeable surrounding sidewall 125 and the liquid permeable planar web reinforcing element 170 are adjacent to one another, they can be attached to one another via an adhesive that is of course resistant to the liquid 40, with the adhesive preferably being 3M Hi-Strength 90 Spray adhesive (Manufacturers part number 90-24) and/or Arrow Hot Melt Glue sticks (Manufacturers part number MG24-4), or a suitable equivalent.

Continuing, on the leak detection apparatus 30, in looking at the FIG. 7 cross section, on the wicking permeable surrounding sidewall 125 encases 150 the first 75 and second 85 flexible members within the sidewall 125, as the sidewall 125 is positioned adjacent 145 to the first 75 and second 85 flexible members. Preferably the sidewall 125 is adhered to the first 75 and second 85 flexible members via the atomized adhesive 115 that is disposed upon the first 75 and second 85 flexible members. The atomized adhesive is preferably 3M Hi-Strength 90 Spray Adhesive (Manufacturers Number 90-24), or a suitable equivalent that is resistant to the liquid 40. This encasement 150 and 160 is operational to help prevent direct contact as between the first 75 and second 85 flexible members and the liquid 40 presence except as liquid communication 60 or 65. This liquid communication 60 or 65 substantially 165 through the liquid wicking permeable surrounding sidewall 125 from the area 45 to the first 75 and second 85 flexible members is to maintain control of the leak sensing process by preventing an inadvertent closed state 100 of the first 75 and second 85 flexible members coming into contact with an electrically conductive liquid communication line 50.

Optionally, on the leak detection apparatus 30, the first 75 and second 85 flexible members are positioned relative to one another adjacent to the liquid wicking permeable surrounding sidewall 125 to have a high resistance closed circuit state 105 with the presence of a low amount of liquid leakage 60 and to have a low resistance closed circuit state 110 with the presence of a high amount of liquid leakage 65. Thus, operationally resulting in a varying closed circuit resistance between the first 75 and second 85 flexible members being inversely proportional to the liquid leakage rate, best shown in FIG. 4. Also, referring to FIG. 4, the preferred distance as between first 75 and second 85 flexible members is about one quarter inch (at 110) to about three quarter inch (at 105). Thus allowing for a variable perceptible output that can indicate a low to high leakage rate for the level of leakage severity, wherein the perceptible output can virtually be any indication of the open state 95 (almost infinite electrical circuit resistance) all the way to the closed state 100 (almost no electrical circuit resistance) and any electrical circuit resistance in-between, as shown on a visual display, an audible varying sound level, or any other perceptible signal that can also optionally be stored, analyzed, and cumulated.

Continuing, for the leak detection apparatus 30, again looking to FIG. 4 and FIG. 7, wherein the varying closed 100 electrical circuit resistance between the first 75 and second 85 flexible members is accomplished by varying a distance 245 as between each of the first 75 and second 85 flexible members along their respective first 80 and second 90 longitudinal axes and a liquid channel 230 disposed within the liquid wicking permeable surrounding sidewall 125. Wherein the liquid channel 230 is oriented lengthwise to be substantially parallel to the radial axis 140, and wherein the liquid channel 230 further helps 240 to direct the liquid 40 toward the first 75 and second 85 flexible members.

METHOD OF USE

Looking at FIGS. 5, 6, 8, and 9, the method of using the leak detection apparatus 30 is shown for sensing presence of a liquid 40 external to a liquid communication line 50 having a liquid flow axis 55, that includes the steps of: firstly providing a leak detection apparatus 30. The leak detection apparatus 30 includes a first flexible member 75 having a first longitudinal axis 80, wherein the first flexible member 75 is constructed of an electrically conductive material that is in a normally open circuit state 95, also included is a second flexible member 85 having a second longitudinal axis 90, wherein the second flexible member 85 is constructed of an electrically conductive material that is in a normally open circuit state 95. Further included is an atomized adhesive 115 disposed upon the first 75 and second 85 flexible members, continuing, included is a sodium polyacrylate base material 130 in granular form, and a liquid wicking permeable surrounding sidewall 125 that is formed about a radial axis 140, with the liquid wicking permeable surrounding sidewall 125 being infused with said sodium polyacrylate 130 base material. The liquid wicking permeable surrounding sidewall 125 is positioned to encase 150 a portion of the first 75 and second 85 flexible members by virtue of the adhesive 115 disposed upon the first 75 and second 85 flexible members.

The liquid permeable surrounding sidewall 125 is constructed of a non electrically conductive material, wherein operationally the liquid wicking permeable surrounding sidewall 125 becomes electrically conductive 155 when the liquid 40 is present in the liquid wicking permeable surrounding sidewall 125, facilitating the first 75 and second 85 flexible members to move from the normally open circuit state 95 to a closed circuit state 100 resulting in a perceptible output. Further included in the leak detection apparatus 30 is an atomized adhesive 115 disposed upon the liquid wicking permeable surrounding sidewall 125, a temperature sensitive adhesive 120, and a means 220 for removably engaging. Also included is a pair of liquid permeable planar web reinforcing elements 170 that are positioned to sandwich 190 the liquid wicking permeable surrounding sidewall 125 by virtue of the adhesive 115 disposed upon the liquid wicking permeable surrounding sidewall 125. Wherein, the liquid permeable planar web reinforcing elements 170 each have a margin portion 195 that extends beyond the liquid wicking permeable surrounding sidewall 125, see FIG. 7, wherein the margin portions 195 are affixed 200 to one another by virtue of the temperature sensitive adhesive 120.

A next step is of forming 260 the combined first 75 and second 85 flexible members, the surrounding sidewall 125, and the planar web reinforcing elements 170 into a frustroconical shape 205 adjacent to the liquid communication line 50. Further, a step of positioning 265 the frustroconical shape 205 such that the radial axis 140 and the liquid flow axis 55 are substantially co-axial 250, as best seen in FIGS. 8 and 9. A next step in attaching 270 the pair of liquid permeable planar web reinforcing elements 170 by virtue of the means 220 for removably engaging that is disposed upon the planar web reinforcing element 170, for the purpose of retaining the frustroconical shape 205, again as best shown in FIGS. 8 and 9.

An optional method of use step for the leak detection apparatus 30 is to have the liquid permeable planar web reinforcing element 170 that faces 255 the liquid communication line 50 to further include the liquid channel 230 as previously discussed, and then further comprising a step of positioning the liquid channel 230 to be oriented lengthwise 275 to be substantially parallel to said liquid flow axis 55, as shown in FIGS. 8 and 9. Another optional method of use step for the leak detection apparatus 30, is to further comprise a step of positioning 276 the liquid channel 230 to be oriented below the liquid communication line 50, also as best shown in FIGS. 8 and 9. Additionally, an optional method of use step for the leak detection apparatus 30, is to further comprise a step of positioning 280 a major diameter 206 of the frustroconical shape 205 to be elevated above a minor diameter 207 of the frustroconical shape 205, as best shown in FIGS. 8 and 9. Note that the difference of the major diameter 206 being larger than the minor diameter 207 can be varied, as FIGS. 8 and 9 show for pictorial clarity a smaller difference as between the major diameter 206 and the minor diameter 207, whereas FIGS. 5 and 6 show a larger difference as between the major diameter 206 and the minor diameter 207. Generally it is preferred to be a larger difference as between the major diameter 206 and the minor diameter 207, wherein the major diameter 206 is about twice or more of the minor diameter 207, similar to what is shown in FIGS. 5 and 6.

CONCLUSION

Accordingly, the present invention of a leak detection apparatus has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

The invention claimed is:

1. A leak detection apparatus for sensing presence of a liquid in an area, said leak detection apparatus comprising:
 (a) a first flexible member having a first longitudinal axis, wherein said first flexible member is constructed of an electrically conductive material that is in a normally open circuit state;
 (b) a second flexible member having a second longitudinal axis, wherein said second flexible member is constructed of an electrically conductive material that is in a normally open circuit state;
 (c) a liquid wicking permeable surrounding sidewall that is about a radial axis of said liquid wicking permeable surrounding sidewall, said liquid wicking permeable surrounding sidewall is positioned adjacent to said first and second flexible members, said liquid wicking permeable surrounding sidewall is constructed of a non-electrically conductive material, wherein operationally said liquid wicking permeable surrounding sidewall becomes electrically conductive when the liquid is present in said liquid wicking permeable surrounding sidewall, facilitating said first and second flexible members to move from the normally open circuit state to a closed circuit state resulting in a perceptible output, said liquid wicking permeable surrounding sidewall is structurally formed into a frustroconical shape to partially encase an area defined by a liquid communication line, wherein said liquid wicking permeable surrounding sidewall frustroconical shape has a lengthwise axis and the liquid communication line has a longwise axis positioned such that said lengthwise axis and the longwise axis are substantially co-axial, and;
 (d) a liquid permeable planar web reinforcing element that is oriented adjacent to said liquid wicking permeable surrounding sidewall wherein said liquid permeable planar web reinforcing element is oppositely disposed from said first and second flexible members, said liquid permeable planar web reinforcing element is structurally formed into a frustroconical shape to partially encase the area defined by the liquid communication line, wherein said liquid permeable planar web reinforcing element frustroconical shape has said lengthwise axis and the liquid communication line has the longwise axis positioned such that said lengthwise axis and the longwise axis are substantially co-axial, wherein operationally said adjacent liquid wicking permeable surrounding sidewall and said liquid permeable planar web reinforcing element frustroconical shapes help to direct the liquid toward said first and second flexible members.

2. A leak detection apparatus according to claim 1 further comprising a sodium polyacrylate base material disposed adjacent to said liquid wicking permeable surrounding sidewall, wherein operationally said sodium polyacrylate base material further adds liquid absorption capabilities to said liquid wicking permeable surrounding sidewall.

3. A leak detection apparatus according to claim 1 wherein said liquid wicking permeable surrounding sidewall and said liquid permeable planar web reinforcing element further comprise a means for removable engagement to the liquid communication line.

4. A leak detection apparatus according to claim 1 wherein said frustroconical shape further comprises a liquid channel disposed within said liquid permeable planar web reinforcing element, said liquid channel is oriented lengthwise to be substantially parallel to said lengthwise axis, wherein said liquid channel further helps to direct the liquid toward said first and second flexible members.

5. A leak detection apparatus according to claim 1 wherein said liquid wicking permeable surrounding sidewall is constructed of material selected from the group consisting essentially of bamboo fiber and cotton.

6. A leak detection apparatus according to claim 5 wherein said liquid wicking permeable surrounding sidewall encases said first and second flexible members within said sidewall, being operational to help prevent direct contact as between said first and second flexible members and the liquid presence except as liquid communication substantially through said liquid wicking permeable surrounding sidewall from the area to the first and second flexible members.

7. A leak detection apparatus according to claim 6 wherein said liquid permeable planar web reinforcing element encases said liquid wicking permeable surrounding sidewall.

8. A leak detection apparatus for sensing presence of a liquid external to a liquid communication line having a liquid flow axis, said leak detection apparatus comprising:
   (a) a first flexible member having a first longitudinal axis, wherein said first flexible member is constructed of an electrically conductive material that is in a normally open circuit state;
   (b) a second flexible member having a second longitudinal axis, wherein said second flexible member is constructed of an electrically conductive material that is in a normally open circuit state;
   (c) an atomized adhesive disposed upon said first and second flexible members;
   (d) a sodium polyacrylate base material in granular form;
   (e) a liquid wicking permeable surrounding sidewall that is formed about a radial axis of said liquid wicking permeable surrounding sidewall, said liquid wicking permeable surrounding sidewall is infused with said sodium polyacrylate base material, said liquid wicking permeable surrounding sidewall is positioned to encase a portion of said first and second flexible members by virtue of said adhesive disposed upon said first and second flexible members, said liquid wicking permeable surrounding sidewall is constructed of a non-electrically conductive material, wherein operationally said liquid wicking permeable surrounding sidewall becomes electrically conductive when the liquid is present in said liquid wicking permeable surrounding sidewall, facilitating said first and second flexible members to move from the normally open circuit state to a closed circuit state resulting in a perceptible output;
   (f) an atomized adhesive disposed upon said liquid wicking permeable surrounding sidewall;
   (g) a temperature sensitive adhesive;
   (h) a means for removably engaging; and
   (i) a pair of liquid permeable planar web reinforcing elements that are positioned to sandwich said liquid wicking permeable surrounding sidewall by virtue of said adhesive disposed upon said liquid wicking permeable surrounding sidewall, wherein said liquid permeable planar web reinforcing elements each have a margin portion that extends beyond said liquid wicking permeable surrounding sidewall, wherein said margin portions are affixed to one another by virtue of said temperature sensitive adhesive, wherein said combined first and second flexible members, said surrounding sidewall, and said planar web reinforcing elements are formed into a frustroconical shape adjacent to the liquid communication line by virtue of said means for removably engaging that is disposed upon a planar web reinforcing element, with said radial axis and said liquid flow axis being substantially co-axial.

9. A leak detection apparatus according to claim 8 wherein said liquid wicking permeable surrounding sidewall is constructed of material selected from the group consisting essentially of bamboo fiber and cotton.

10. A method of using a leak detection apparatus for sensing presence of a liquid external to a liquid communication line having a liquid flow axis, comprising the steps of:
   (a) providing a leak detection apparatus that includes a first flexible member having a first longitudinal axis, wherein said first flexible member is constructed of an electrically conductive material that is in a normally open circuit state, also included is a second flexible member having a second longitudinal axis, wherein said second flexible member is constructed of an electrically conductive material that is in a normally open circuit state, further included is an atomized adhesive disposed upon said first and second flexible members, continuing, included is a sodium polyacrylate base material in granular form, and a liquid wicking permeable surrounding sidewall that is formed about a radial axis of said liquid wicking permeable surrounding sidewall, said liquid wicking permeable surrounding sidewall is infused with said sodium polyacrylate base material, said liquid wicking permeable surrounding sidewall is positioned to encase a portion of said first and second flexible members by virtue of said adhesive disposed upon said first and second flexible members, said liquid wicking permeable surrounding sidewall is constructed of a non-electrically conductive material, wherein operationally said liquid wicking permeable surrounding sidewall becomes electrically conductive when the liquid is present in said liquid wicking permeable surrounding sidewall, facilitating said first and second flexible members to move from the normally open circuit state to a closed circuit state resulting in a perceptible output, further included is an atomized adhesive disposed upon said liquid wicking permeable surrounding sidewall, a temperature sensitive adhesive, a means for removably engaging, and a pair of liquid permeable planar web reinforcing elements that are positioned to sandwich said liquid wicking permeable surrounding sidewall by virtue of said adhesive disposed upon said liquid wicking permeable surrounding sidewall, wherein said liquid permeable planar web reinforcing elements each have a margin portion that extends beyond said liquid wicking permeable surrounding sidewall, wherein said margin portions are affixed to one another by virtue of said temperature sensitive adhesive;
   (b) forming said combined first and second flexible members, said surrounding sidewall, and said planar web reinforcing elements into a frustroconical shape adjacent to the liquid communication line;

(c) positioning said frustroconical shape such that said radial axis and said liquid flow axis are substantially co-axial; and (d) attaching said pair of liquid permeable planar web reinforcing elements by virtue of said means for removably engaging that is disposed upon a planar web reinforcing element, for the purpose of retaining said frustroconical shape.

11. A method of using a leak detection apparatus according to claim 10 wherein said liquid permeable planar web reinforcing element that faces the liquid communication line further comprises a liquid channel, further comprising a step of positioning said liquid channel to be oriented lengthwise to be substantially parallel to said liquid flow axis.

12. A method of using a leak detection apparatus according to claim 11, further comprising a step of positioning said liquid channel to be oriented below the liquid communication line.

13. A method of using a leak detection apparatus according to claim 12, further comprising a step of positioning a major diameter of said frustroconical shape to be elevated above a minor diameter of said frustroconical shape.

* * * * *